United States Patent [19]

Schmitzer

[11] 3,960,506

[45] June 1, 1976

[54] APPARATUS FOR PRODUCING HOMOGENEOUS MATERIALS OR FOAM FROM AT LEAST TWO INTER-REACTING COMPONENTS

[75] Inventor: Willi Schmitzer, Birlinghoven, Germany

[73] Assignee: Bayer Aktiengesellschaft, Leverkusen, Germany

[22] Filed: July 9, 1973

[21] Appl. No.: 377,490

Related U.S. Application Data

[63] Continuation of Ser. No. 146,373, May 24, 1971, abandoned.

[30] Foreign Application Priority Data

June 20, 1970 Germany............................ 2030516

[52] U.S. Cl.................................. 23/285; 23/252 R; 137/625.4; 137/625.18; 137/625.19; 260/2.5 BC; 259/4 R
[51] Int. Cl.²...................... B01F 5/10; C08G 69/04
[58] Field of Search........................ 23/285, 252 R; 137/625.4, 625.18, 625.19; 259/78.4, 107, 108; 260/2.5 BC

[56] References Cited

UNITED STATES PATENTS

| 2,868,518 | 1/1959 | Corley, Jr. et al. | 23/252 R |
| 2,958,516 | 11/1960 | Wall et al. | 23/252 R X |
| 3,026,183 | 3/1962 | Cole | 23/252 R |
| 3,051,455 | 8/1962 | Magester | 259/8 |

Primary Examiner—James H. Tayman, Jr.
Attorney, Agent, or Firm—Burgess, Dinklage & Sprung

[57] ABSTRACT

Apparatus for the production of homogeneous material or foam from a plurality of components. A three-way valve is communicated with supply tanks for the components by pipes having pumps interposed therein. The valve cock has a mixing chamber therein and an outlet for discharge of the mixed components to a mold, and is provided with passageways so that depending on the position of the cock the components can be delivered to the mixing chamber or to return lines for the individual components which lead to the intake side of the pumps. The components are constantly pumped, passing either to the mixing chamber or to the return lines.

14 Claims, 11 Drawing Figures

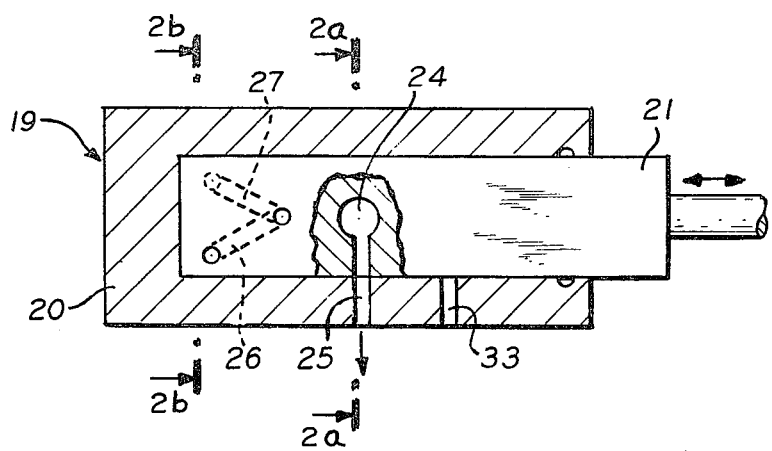
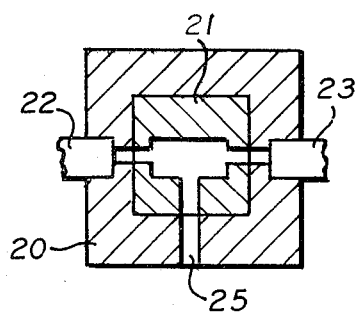
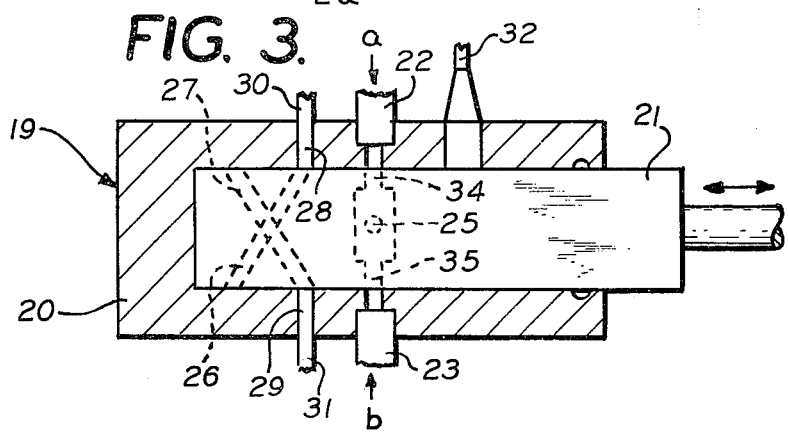
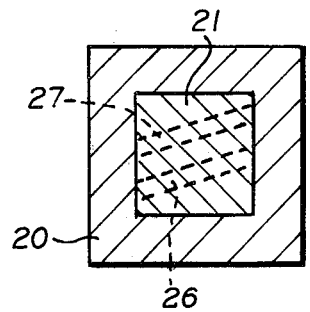
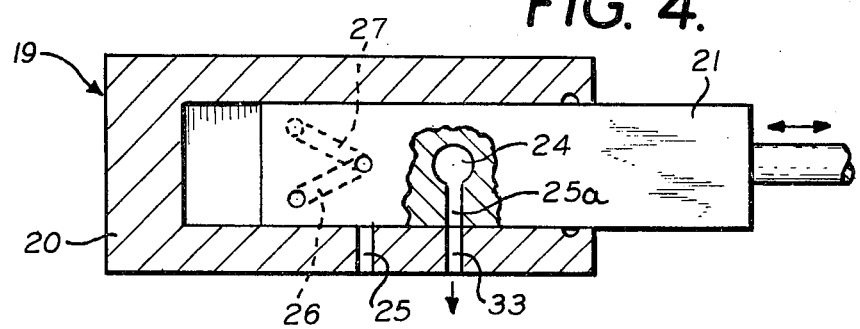
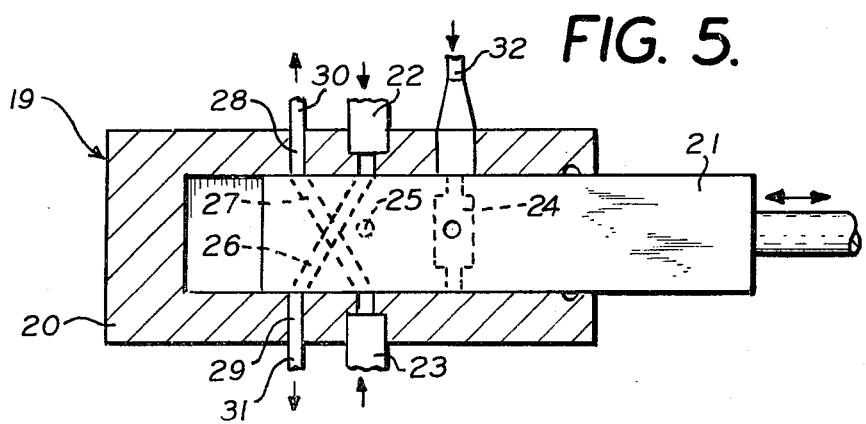

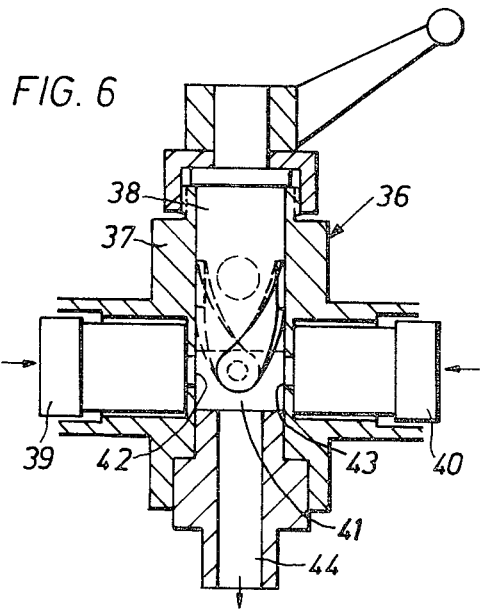
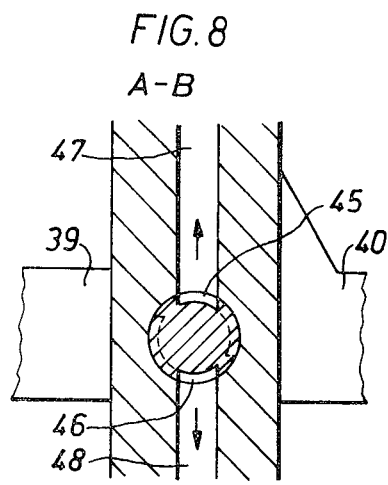
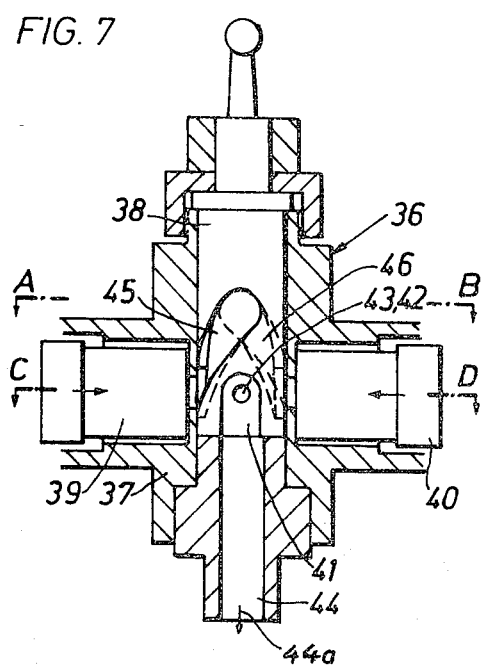
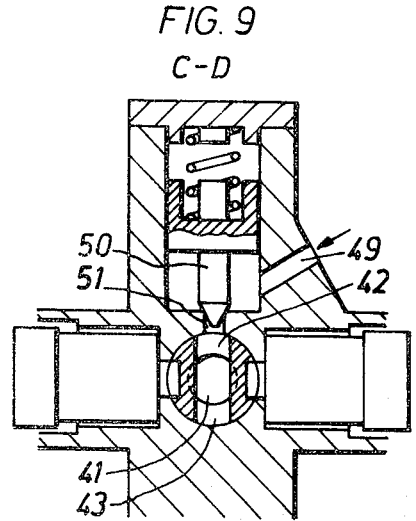

APPARATUS FOR PRODUCING HOMOGENEOUS MATERIALS OR FOAM FROM AT LEAST TWO INTER-REACTING COMPONENTS

This is a continuation, of application Ser. No. 146,373, filed May 24, 1971, now abandoned.

This invention relates to a process and an apparatus for producing homogeneous materials or foams from at least two inter-reacting components which are continuously delivered. During an inoperative period, the components are recycled to the respective suction ends of the delivery means whilst, during a working period, they are sprayed into and mixed in a mixing zone. The completed mixture is preferably discharged into a mould.

Accordingly, the object of the process and the apparatus is to produce homogeneous materials or foams. The materials produced may be formed, for example in a mould or in work pieces such as motor-vehicle body work sections, air-frames, and double-walled containers, or may be used for coating surfaces.

The object of the invention is to avoid faults in plastics or plastics components especially on their surface, of the kind which occur when one of the reaction components precedes the other on entry into the mixing zone or lags behind on completion of the mixing operation. This leading or trailing phenomenon causes a relatively small proportion of one of the components to remain unmixed. It this small proportion of unmixed component is introduced into a casting mould or cavity or is applied to a surface, a weakening fault in the finished product results. The products cannot therefore be used, especially in cases where the fault is visible for example when it is on the surface of a moulding or when it is in a thin sheet of visible material, for example, that surface facing the passenger compartment on an instrument panel in a motor vehicle. For this reason, it is extremely important to prevent one of the components from leading or trailing the other.

According to the present invention there is provided a process for the production of homogeneous materials or foams from a plurality of inter-reacting components which are continuously delivered from delivery means, the components being recycled to the respective low-pressure ends of the delivery means during inoperative periods, and being sprayed into and mixed in mixing one during working periods, the completed mixture being thereafter discharged from the mixing zone, wherein the components are atomised during both the inoperative and working periods but are recycled in unmixed form during inoperative periods.

The tendency of one of the components to lead or trail the other is eliminated by virtue of the fact that the components are atomised during both inoperative and operative periods, but components being recycled in an unmixed form during an inoperative period. Although cycling of the components is already known (British Pat. Specification No. 950,347), this known device is a low-pressure one in which a threeway reversing valve is arranged in each delivery pipe, the arrangement being such that each reversing valve can be actuated at the same time whilst return flow takes place, without the components passing through the actual inlet valves or nozzles.

However, the essential feature of the present invention is that, by virtue of the fact that the components are continuously sprayed, even during the inoperative period, the entire delivery pipe system remains free from fluctuations in pressure despite the fact that at high pressures fluctuations in pressure can occur in the form of resonance phenomena, for example due to actuating the nozzles. These resonance phenomena can in turn cause one of the components to lead or trail the other.

Accordingly, it is possible by virtue of the invention for the components to be sprayed under pressure in such a way that a uniform jet issues continuously from the inlet nozzles and is sprayed under uniform conditions during the working period, i.e. during spraying into the mixing chamber, even at the beginning and end of the mixing operation.

The process according to the invention is applicable to any free-flowing reaction components which can be sprayed, for example for the production of homogeneous materials, in which a plastics component is mixed with a liquid hardener. The process according to the invention is particularly suitable for the production of solid or foamed plastics or mouldings based on polyurethane, unsaturated polyesters, epoxide resin, $\epsilon$-caprolactam and copolymers thereof.

According to the present invention there is provided an apparatus for the production of homogeneous materials or foams from a plurality of inter-reacting components comprising a plurality of delivery pipe systems in each of which a continuously working pump is arranged, those sections of the delivery pipe systems which are at a high pressure terminating in inlet nozzles which open into a mixing chamber and having reversible three-way valves arranged therein, the three-way valves being adapted to connect the high-pressure sections of the delivery pipe systems to return pipes which connect with the low pressure sections of the delivery pipe systems and to the mixing chamber during inoperative and working periods respectively wherein a single common three-way valve is provided which is arranged between the inlet nozzles and the mixing chamber and comprises an arrangement that, in an inoperative period position, the return ducts connect the inlet nozzles to the connecting bores in the valve housing for the return flow whilst, in a working position, the delivery ducts connect the inlet nozzles to the mixing chamber.

The novel feature of the apparatus according to the invention that a single common three-way valve is provided which is arranged between the inlet nozzles and the mixing chamber and comprises return ducts and delivery ducts for each component in such an arrangement that, in the inoperative period position, the return ducts connect the inlet nozzles to the connecting bores in the valve housing for the return flow pipes whilst, in the working position, the delivery ducts connect the inlet nozzles with the mixing chamber.

The return flow ducts and the delivery ducts may be either completely in the valve cock or partly in the valve cock and partly in the valve housing. This provides the designer with a number of design possibilities. The use of a single common three-way valve for both components ensures that the feed and interruption in the feed of the components to the mixing chamber always has to take place synchronously without either of the components leading or trailing the other, which of course means that the three-way valve has to be very carefully manufactured.

The three-way valve is preferably in the form of a flat slide or a rotary slide.

In one particularly advantageous embodiment of the apparatus according to the invention, the mixing chamber is arranged at least partly and preferably completely in the three-way valve.

In one particularly advantageous embodiment of the invention, the return flow ducts are milled into the stopcock of a rotary slide valve whilst the feed ducts are in the form of radial bores, the mixing chamber being arranged centrally between the feed ducts in the stopcock. The particular advantage of this arrangement is that the feed ducts can be kept extremely short so that the inlet nozzles can be arranged very close together opposite to one another.

In order to keep the mixing chamber as free as possible from dead angles, even during the inoperative periods, the feed ducts preferably widen continuously from the periphery of the stopcock and open continuously into the mixing chamber.

In addition, the throughput rate of the components per unit of time during the reversing operation is governed by the geometric form of the return flow ducts. For this reason, in another advantageous embodiment of the invention, the valve stopcock is designed to be replaceable so that it is possible to use valve stopcocks with differently designed return flow ducts depending on requirements.

The use of a rotary slide valve has the further advantage that valves of this kind are unaffected by any deposits which may accumulate, thus increasing reliability.

The three-way valve is preferably provided with a flushing means which can be filled for example and as known per se with a liquid flushing agent or with compressed air.

Naturally, the apparatus can be produced in a variety of different forms without in any way from the scope of the invention.

Referring to the accompanying drawings, which show two characteristic embodiments of the apparatus according to the invention:

FIG. 1 is a plan of the apparatus as a whole,

FIGS. 2 to 5 show embodiments of the three-way valve in the form of a flat slide valve, and FIGS. 6 to 9 show embodiments of the three-way valve in the form of a rotary slide valve FIG 2 is a longitudinal section through the housing of the flat slide valve in the working position, and FIG. 3 is a longitudinal sectional side view of FIG. 2. FIG. 2a and FIG. 2b are taken, respectively, on lines 2a—2a and 2b—2b in FIG. 2.

FIG. 4 is a longitudinal section through the housing of the flat slide valve in the inoperative position, and FIG. 5 is a longitudinal sectional side view of FIG. 4, FIG. 6 is a longitudinal section through the housing of the rotary slide valve in the working position.

FIG. 7 is a longitudinal section through the housing of the rotary slide valve in the inoperative position, FIG. 8 is a section on the line A–B of FIG. 7 illustrating the return flow cycle, and FIG. 9 is a section on the line C–D of FIG. 7 illustrating the flushing operation.

Figure 1:
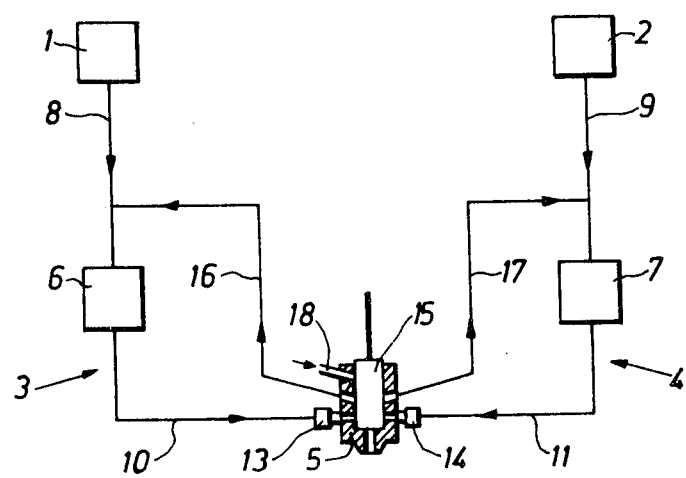

As shown in FIG. 1, the reaction components are delived to a mixing chamber 5 from supply containers 1 and 2 through delivery pipe systems 3 and 4. Delivery is affected by pumps 6 and 7 which divide the delivery pipe systems 3 and 4 into a suction-side section 8,9 and a pressure-side section 10,11 The pressure-side sections 10,11 terminate in inlet nozzles 13,14 which open into the mixing chamber 5. A three-way valve is denoted by the reference 15. Return flow pipes 16, 17 lead from the mixing head 5 to the suction-side 8,9 of the delivery pipe systems 3 and 4. A diagrammatically indicated flushing means is denoted by the reference 18. The design of the three-way valve 15 is discussed in detail in the following with reference to the special embodiments shown in FIGS. 2 to 5 and 6 to 9.

According to FIGS. 2 to 5, a three-way valve 19 consists of a housing 20 and a movable member in the form of flat slide 21 which is rectangular in cross section. In the working position (FIGS. 2 and 3), the two components $a$ and $b$ are sprayed through inlet nozzles 22, 23 and feed ducts 34, 35 into a mixing chamber 24 arranged directly in the flat slide 21. The mixture leaves the mixing chamber 24 and the housing 20 through an outlet duct 25. Return flow ducts 26, 27 are additionally provided in the flat slide 21. Connecting bores 28, 29 for return flow pipes 30, 31 are provided accordingly in the housing 22. A connection for flushing agent is denoted by the reference 32 whilst the outlet duct for the flushing agent is denoted by a reference 33. In the working position (FIGS. 2 and 3) the outlet duct 25 is in the open condition for flow of material therethrough from the mixing chamber 24.

FIGS. 4 and 5 characterise the inoperative-period position of the flat slide valve 21. Although the components are still being sprayed through the inlet nozzles 22, 23, they flow by virtue of the position of the flat slide valve 21 through the return flow ducts 26, 27 to the connecting bores 28, 29 and back into the suction-side delivery pipe system through the return flow pipes 30, 31. At the same time, the flushing means (not shown) forces a flushing agent into the mixing chamber 24 through a flushing agent connection 32 and, by sodoing, cleans the mixing chamber 24. The flushing agent leaves the mixing chamber 24 through the flushing-agent outlet duct 33 which, in this position, coincides with that part 25a of the outlet duct 25 of the mixing chamber 24 situated in the flat slide valve 21. In the inoperative position the outlet duct 25 is in the closed position.

According to FIGS. 6 to 9, a three-way valve 36 consists of a housing 37 and of a movable member stopcock 38 which is cylindrical in cross section.

FIG. 6 characterises the working-period position in which the components are sprayed through inlet nozzles 39, 40 and feed ducts 42, 43 into a mixing chamber 41. The mixture leaves the mixing chamber 41 through an outlet duct 44.

FIGS. 7 to 9 characterise the inoperative-period position in which the components are sprayed through the inlet nozzles 39, 40 but, on this occasion, flow into return flow ducts 45, 46 which carry the components to return flow pipes 47, 48 from which they flow into the suction-side sections of the delivery pipe systems. The mixing chamber 41 and the feed ducts 42, 43, are flushed during the return flow operation. The flushing agent is introduced under pressure through a flushing agent inlet duct 49, and when a valve 50 is opened, flows through an inlet duct 51 into the mixing chamber 41, leaving it through the outlet duct 44 (FIG. 7), as is indicated by the arrow 44a.

We claim:

1. An apparatus for the production of homogeneous materials or foams from a plurality of components comprising:

a. a pipe system for each component, each pipe system including a delivery pipe having a pump operatively connected therein for providing the component under high pressure, and a return pipe connected to the delivery pipe at the intake side of the pump, for return of the component from the discharge side to the intake side of the pump,
b. a nozzle at the high pressure discharge end of each delivery pipe,
c. a three-way valve to which each of the nozzles and return pipes is connected for continuously receiving the components from the nozzles and, alternatively, mixing and discharging the mixed components, or delivering them unmixed to the return pipes for return of the components, unmixed, to the intake side of the pumps,
d. said three-way valve comprising:
 1. a housing,
 2. a movable member in said housing movable between a first position for said mixing of the components, and a second position for said return of the components,
 3. a mixing chamber in the movable member for simultaneously receiving the components from the nozzles with the movable member in said first position, an outlet communicating with the mixing chamber for discharge of the mixed components components the mixing chamber and from the housing with the movable member in said first position, said mixing chamber being sealed from the nozzles with the movable member in said second position,
 4. a return duct for each component in the movable member for receiving the components from the nozzles, and returning them independently to the return lines, with the valve in said second position, said return ducts being sealed from the nozzles with the valve in said first position,
e. said valve having:
 1. inlet passageways in said housing leading from nozzles to the movable member,
 2. housing outlet passageways leading from the movable member to the return pipes,
 3. movable member inlets in the movable member positioned for communicating the housing inlet passageways with the mixing chamber with the movable member in said first position and further positioned so that the movable member inlets are sealed with respect to the housing inlet passageways with the movable member in said second position,
 4. movable member return passageways in the movable member position for communicating the housing inlet passageways with the housing outlet passageways with the movable member in said second position for said delivery of the components to the return pipes and further positioned so that the housing inlet passageways are sealed with respect to the housing outlet passageways with the movable member in said first position.

2. Apparatus according to claim 1, said valve comprising an inlet and an outlet in the valve housing communicating with the mixing chamber with the valve in said second position for passing a flushing agent through the mixing chamber with the valve in said second position.

3. Apparatus according to claim 1, said movable valve member being slidably between said first and second positions.

4. Apparatus according to claim 1, said movable valve member being cylindrical in cross-section, and being rotatable between said first and second positions.

5. Apparatus according to claim 4, said return ducts in the cylindrical valve member being milled therein, and radial bores in the valve housing for communicating the nozzles with mixing chamber.

6. Apparatus according to claim 1, the cylindrical valve member being replacable.

7. Apparatus according to claim 1, said valve comprising an inlet in the valve housing communicating with the mixing chamber with the valve in said second position for introducing a flushing agent into the mixing chamber with the valve in said second position.

8. Apparatus according to claim 3, said movable valve member being rectangular in cross-section.

9. Apparatus according to claim 3, said movable valve member being movable between said first and second positions by reciprocating said valve member.

10. Apparatus according to claim 1, the mixing chamber being a stirrerless mixing chamber.

11. Apparatus according to claim 4, the mixing chamber being a stirrerless mixing chamber.

12. Apparatus according to claim 9, the mixing chamber being a stirrerless mixing chamber.

13. Apparatus according to claim 2, the mixing chamber being a stirrerless mixing chamber.

14. Apparatus according to claim 7, the mixing chamber being a stirrerless mixing chamber.

* * * * *